United States Patent [19]
Beater et al.

[11] Patent Number: 5,421,156
[45] Date of Patent: * Jun. 6, 1995

[54] HYDRAULIC DRIVE SYSTEM

[75] Inventors: Peter Beater, Haibach; Alfred Krusche, Johannesberg; Siegfried Schurawski, Miltenberg, all of Germany

[73] Assignee: Linde Aktiengesellschaft, Germany

[*] Notice: The portion of the term of this patent subsequent to Mar. 8, 2011 has been disclaimed.

[21] Appl. No.: 159,440

[22] Filed: Nov. 30, 1993

Related U.S. Application Data

[63] Continuation of Ser. No. 824,367, Jan. 23, 1992, Pat. No. 5,291,676.

[30] Foreign Application Priority Data

Jan. 25, 1991 [DE] Germany ............ 41 02 203.3

[51] Int. Cl.6 .................................... F16D 31/02
[52] U.S. Cl. ........................................ 60/468; 60/493; 60/494
[58] Field of Search .......... 60/459, 422, 468, 494, 60/493; 91/518, 444, 446, 448, 517

[56] References Cited

U.S. PATENT DOCUMENTS

| | | | |
|---|---|---|---|
| 3,993,158 | 11/1976 | Weight et al. | 60/468 X |
| 4,118,931 | 10/1978 | Nonnenmacher et al. | 60/494 X |
| 4,625,749 | 12/1986 | Eskildsen | 60/420 X |
| 4,638,886 | 1/1987 | Marietta | 91/517 X |
| 4,665,699 | 5/1987 | Krusche . | |
| 4,845,947 | 7/1989 | Persson et al. | 60/468 X |
| 4,850,191 | 7/1989 | Kreth et al. | 60/422 |
| 5,111,660 | 5/1992 | Gettel | 60/468 |
| 5,291,676 | 3/1994 | Beater et al. . | |

FOREIGN PATENT DOCUMENTS

| | | | |
|---|---|---|---|
| 0065304 | 11/1982 | European Pat. Off. | 60/450 |
| 3146561 | 6/1982 | Germany . | |
| 0054801 | 3/1984 | Japan | 60/452 |

*Primary Examiner*—Edward K. Look
*Assistant Examiner*—Hoang Nguyen
*Attorney, Agent, or Firm*—Thomas R. Schaffer

[57] ABSTRACT

A hydraulic drive system has a consumer of hydraulic power connected to a pressure medium source, e.g., a hydraulic motor 1. The consumer can be actuated by a control valve 4 throttling in intermediate positions; its width of opening is determined by a pressure difference formed at the control valve 4. The pressure difference is derived from a control pressure to be prescribed and the load pressure of the consumer. The consumer can thus be driven with a definite power or a definite torque. To limit the movement speed of the consumer, it is proposed to reduce the control pressure as a function of the speed of movement. The control pressure is present in a control pressure line 7 or 8, which empty at a charging space of the control valve 4, active in the opening direction. A drain line 16 branches from the control pressure line 7 or 8, in which a multiway valve spring-loaded in the closing direction and throttling in intermediate positions is located. It is in working connection with a measuring device that detects the movement speed of the consumer by measuring the volume stream and which is formed of a restrictor 12 located in a line 5 or 6 between the pressure medium source and the consumer, and the lines 13, 14 that branch off upstream and downstream.

5 Claims, 3 Drawing Sheets

HYDRAULIC DRIVE SYSTEM

This application is a continuation application of U.S. patent application Ser. No. 07/824,367, filed Jan. 23, 1992, for which a Notice of Allowance and Issue Fee Due was mailed on Sep. 13, 1993, now U.S. Pat. No. 5,291,676.

BACKGROUND OF THE INVENTION

1. Field of the Invention

The invention concerns a hydraulic drive system with a consumer of hydraulic power connected to a pressure medium source and which is actuatable by means of a throttling control valve throttling in intermediate position, the opening width of which is determined by a power difference derived from a prescribed control signal and the load pressure of the consumer and is created at the control valve.

2. Description of the Art

Such a drive system is known from the DE-OS 31 46 561, where the control signal is formed by a control pressure. In contrast to the otherwise conventional drive system in which the opening width of the control valve is determined exclusively by the level of the control pressure and thus a definite volume stream of pressure medium and a definite movement speed of the consumer are prescribed, in a drive system of this type the pressure medium flows to the consumer with a quite specific pressure or a specific pressure difference on the consumer side, such that the consumer is moved with an accordingly prescribed force or a prescribed torque. Such a drive system can be used for both translatory and rotatory consumers. The drive system is designed so that the force or torque is maintained essentially constant: With decreasing loading of the consumer and thus a dropping load pressure the opening width of the control valve is enlarged due to the constant control pressure to a degree that the load pressure is again brought to the original level due to the volume stream thus increased and the originally set pressure difference is again achieved. However, the movement speed of the consumer is thus increased. An increase in the movement speed can also occur, for example, also if the consumer described is connected to a pump adjustable in stroke volume, which handles one or more additional consumers. Now if the first consumer is operated under a definite load pressure with a fully open control valve, i.e., with the maximum intended movement speed, where the pump pressure is greater by a given amount than the load pressure and if it further increases due to a corresponding loading of a second consumer, the movement speed of the first consumer would exceed the maximum intended value. One shortcoming of the drive system described consists in the fact that apart from speed losses due to friction, the movement speed of the consumer is not limited. This can result in excessive r.p.m.'s in a consumer designed as a hydraulic motor and to destruction of the hydraulic motor.

SUMMARY OF THE INVENTION

The purpose of the present invention is to facilitate a limitation of the movement speed of the consumer in a hydraulic drive system of the above type.

This problem is solved according to the invention in that the control signal can be influenced as a function of the rate of movement of the consumer. The essential concept of the invention accordingly is to shift the power difference at the control valve, as a function of the speed of movement of the consumer, in a direction in which the opening width of the control valve is at least maintained. This means that in a throttling control valve in which the power difference is formed with the aid of a control pressure and the load pressure the control valve does not open further despite a dropping load pressure if the control pressure is correspondingly reduced and thus the pressure difference is maintained. The movement speed of the consumer is thus limited to a definite value, in which case, of course, the force or torque originally desired is no longer achieved.

The control signal can also be an electromagnetic signal, e.g., if the control valve is actuated electrically.

In a hydraulic drive system, in which a control pressure line is connected to a charging space of the control valve that is active in the opening direction and a line that can be acted upon by load pressure is connected to an oppositely active charging space, it is proposed according to an advantageous embodiment of the invention that a drain line branch off the control pressure line, in which a throttling multiway valve spring-loaded in the closing direction and throttling in intermediate positions is installed and which is in working connection with a measuring device that detects the movement speed of the consumer. As soon as a certain movement speed of the consumer is exceeded, the multiway valve opens, such that a reduction in the control pressure occurs and a further increase in the movement speed of the consumer is prevented.

According to an expedient further refinement of the invention, a pressure-limiting valve is placed beyond the multiway valve, with which the control pressure is reduced only to a predetermined level. The control pressure is thus prevented from collapsing altogether.

The use of a pressure limiting valve is particularly meaningful if the drive system is designed dynamically so that a susceptibility to oscillation results.

The pressure-limiting valve or relief-valve jet is advantageously adjustable for specifying various maximum speeds of the consumer.

The movement speed of the consumer can be determined in the most divergent ways. For example, it can be done electrically, such that in this case the multiway valve is designed as an electromagnetically actuated multiway valve. It is particularly simple and expedient if the measuring device consists of a restrictor located in the supply line between the pressure medium source and consumer, where a line branches off upstream from the restrictor and leads to a charging space of the multiway valve active in the opening direction, and a line branches off downstream from the restrictor and it leads to an oppositely active charging space of the multiway valve. The pressure drop that sets in at the restrictor has a known relationship to the volume stream and thus also to the movement speed of the consumer. If the pressure drop at the restrictor exceeds a given value, the multiway valve is opened and the control pressure drops to a value prescribed possibly by the pressure-limiting valve and the movement speed of the consumer is limited to a maximum value. The restrictor can also be adjustable for varying the maximum speed of the consumer.

In a hydraulic drive system, in which the consumer can be acted upon in both directions through two lines coming from the control valve and in which two control pressure lines emptying at oppositely active charging spaces run to the control valve designed as a 4-connection/3-position valve, it is proposed according to an advantageous further refinement of the invention that the control pressure lines be connected with the inputs of a change-over valve, to the output of which the drain line is connected. This can also take place in an expedient variant in that the control pressure lines are connected with the two input-side connections of a 3-connection/2-position valve actuated by pressure and alternately can be connected with the drain line connected on the output side, in which case the 3-connection/2-position valve has two oppositely arranged charging spaces, each of which is connected with one of the lines between the control valve and consumer. The maximum control pressure is thus not determined directly, but indirectly through the control pressure that pertains to the higher load pressure.

It is favorable to install the restrictor for determining the movement speed of the consumer between the pressure medium source and control valve and, in this case, to design the multiway valve as a 2-connection/2-position valve with opening and closing positions. In another favorable embodiment of the invention, it is also possible to install the restrictor in one of the lines between the control valve and consumer and design the multiway valve as a 2-connection/3 position valve with two opening and one closing position lying between them. The fact that the speed measuring signal, namely the pressure drop at the restrictor, is sign-dependent is taken into consideration in the said design of the multiway valve.

The use of a hydraulic drive system on the rotation mechanism drive of an excavator is particularly advantageous. A hydraulic motor is usually employed there as the consumer of hydraulic power; its torque is prescribed by the hydraulic drive system of this type. The drive system according to the invention prevents a destruction of the hydraulic motor due to excessive r.p.m.'s.

Additional advantages and details of the invention are described in greater detail with reference to the implementation example shown in the Figures.

DETAILED DESCRIPTION OF THE PREFERRED EMBODIMENT

Figure 1:
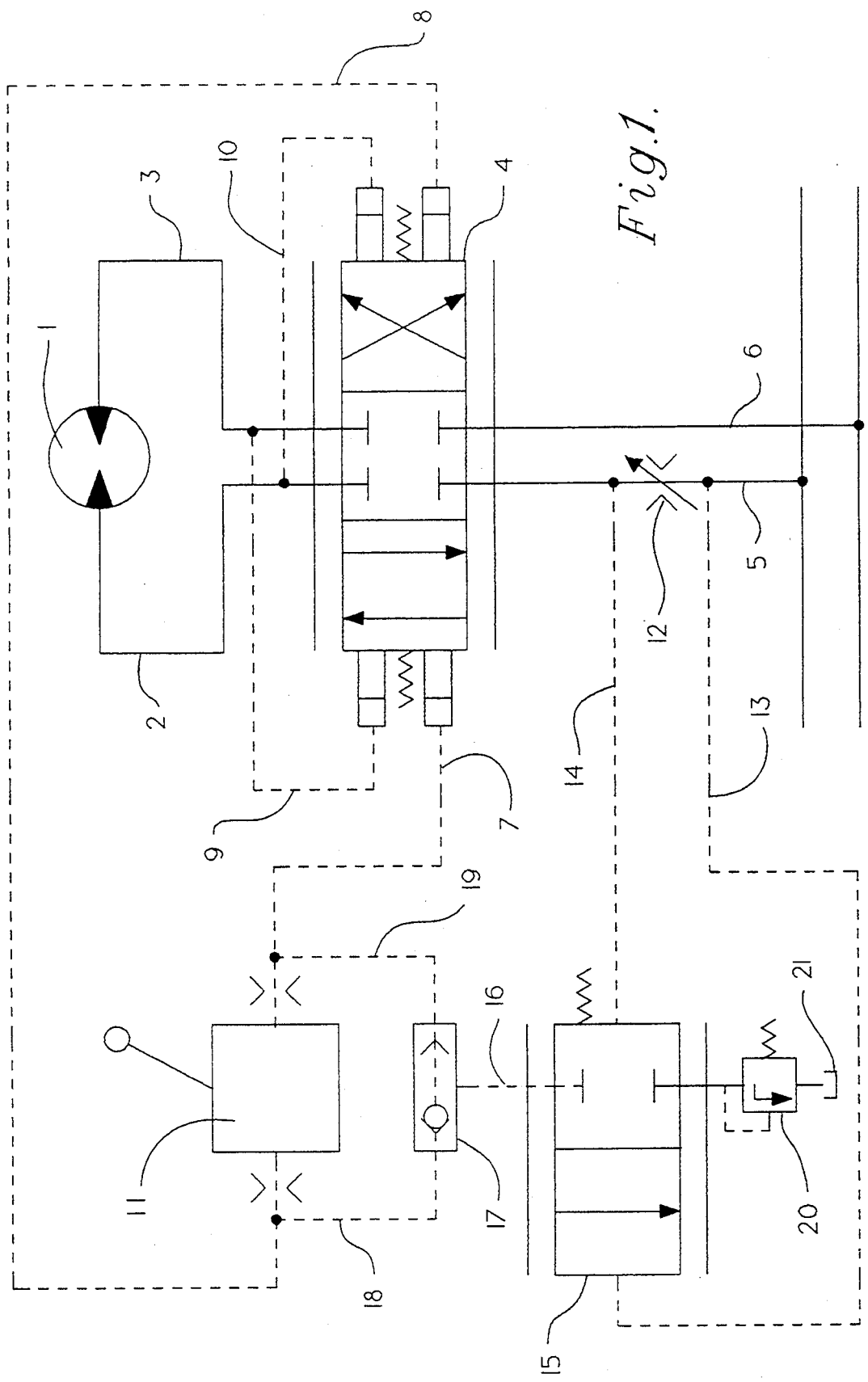
FIG. 1 shows a hydraulic drive system according to the invention.

The implementation example shows the rotation mechanism drive of an excavator. A hydraulic motor 1 that can be acted upon in both directions is connected through lines 2 and 3 to a throttling control valve 4 that is spring-centered and throttles in intermediate positions. It controls the inflow of pressure medium present in line 5 and is made available from a pressure medium source (not shown). A line 6 leads to a tank or into the return line of a hydrostatic drive mechanism. The control valve 4 is designed as a 4-connection/3-position valve. In both movement directions of the control valve 4, a control pressure line 7 or 8 that can be acted upon by control pressure and a line 9 or 10 that can be acted upon by load pressure runs to each of the corresponding charging spaces. The control pressure line 7 and 8 are connected to a control pressure pickoff 11, with which control pressures are arbitrarily adjustable in the control pressure lines 7 and 8. The line 9 carrying the load pressure branches off the line 3 and the line 10 carrying the load pressure branches off the line 2.

The construction of the hydraulic drive system corresponds to the known state of the art up to this point. For example, if a control pressure is built up in the control pressure line 7 with the aid of the control pressure pickoff 11, the control valve 4 or its slider is shifted to the right against the spring force and a connection is effected between the lines 2 and 5 and the lines 3 and 6. Pressure medium thus flows from line 5 into line 2, where the amount of pressure medium flow is dependent on the throttle setting, i.e., the opening width of the control valve 4. A load pressure builds up in the line 2; it acts on the control valve in the closing direction through the line 10. It is not the level of control pressure in line 7, but rather the pressure difference in the control pressure in the control pressure line 7 and the load pressure in line 10 that thus determines the opening width of the control valve 4, such that a pressure-dependent torque can be prescribed at the hydraulic motor 1, but not a volume stream-dependent r.p.m. It is thus impossible in this hydraulic drive system to limit the r.p.m. of the hydraulic motor 1.

According to the invention, the hydraulic drive system is now designed so that the control pressure can be reduced as a function of the speed of the hydraulic motor 1, such that the pressure difference can be maintained at the control valve 4 even when the load pressure drops.

A possibly adjustable restrictor 12 is installed in line 5 for detecting the speed; a pressure gradient develops at it when the pressure medium is flowing. The pressure in front of and beyond the restrictor 12 is distributed through lines 13 and 14 to the charging spaces of a throttling multiway valve, which is designed as a 2-connection/2-position valve 15 throttling in intermediate positions. This multiway valve has an open position and a spring-loaded closing position. The line 13 empties at a charging space acting in the opening direction and the line 14 empties at a charging space of the multiway valve acting in the closing direction. The multiway valve is installed in a drain line 16 that is connected to a change-over valve 17, which passes the higher of the control pressures on through lines 18 and 19 into the control pressure lines 7 and 8. A pressure-limiting valve 20, which is connected to a pressureless reservoir 21, is installed beyond the multiway valve.

The pressure gradient arising at the restrictor 12 in the case of a controlled control valve 4 due to the pressure medium flowing through it is in a known ratio to the volume stream and thus in a first approximation to the speed of the hydraulic motor 1. If the pressure gradient at the restrictor 12 exceeds a prescribed value, i.e., if the speed of the hydraulic motor 1 exceeds a certain value, the multiway valve is opened. The higher of the control pressures delivered by the control pressure pickoff 11 is thus selected by the change-over valve 17 and reduced to a pressure prescribed by the pressure-limiting valve 20 through the opened multiway valve, with the result that a lower control pressure is present in the line 7 and at the control valve 4. The increase in pressure gradient at the restrictor 12 that unleashes the described process then occurs if, for example, the control valve 4 opens somewhat wider due to a lesser loading of the hydraulic motor 1 and thus a reduction in the load pressure in the lines 2 and 10, so that the volume stream between the pressure medium source and hydraulic motor 1 is increased. Through the reduction in control pressure according to the invention, a further opening of the control valve 4 is prevented and thus the volume stream of the pressure medium and the speed of the consumer are limited. The load pressure originally present is then no longer attained, i.e., it is no longer regulated to the torque originally prescribed at the hydraulic motor 1 in this boundary case.

Figure 2:
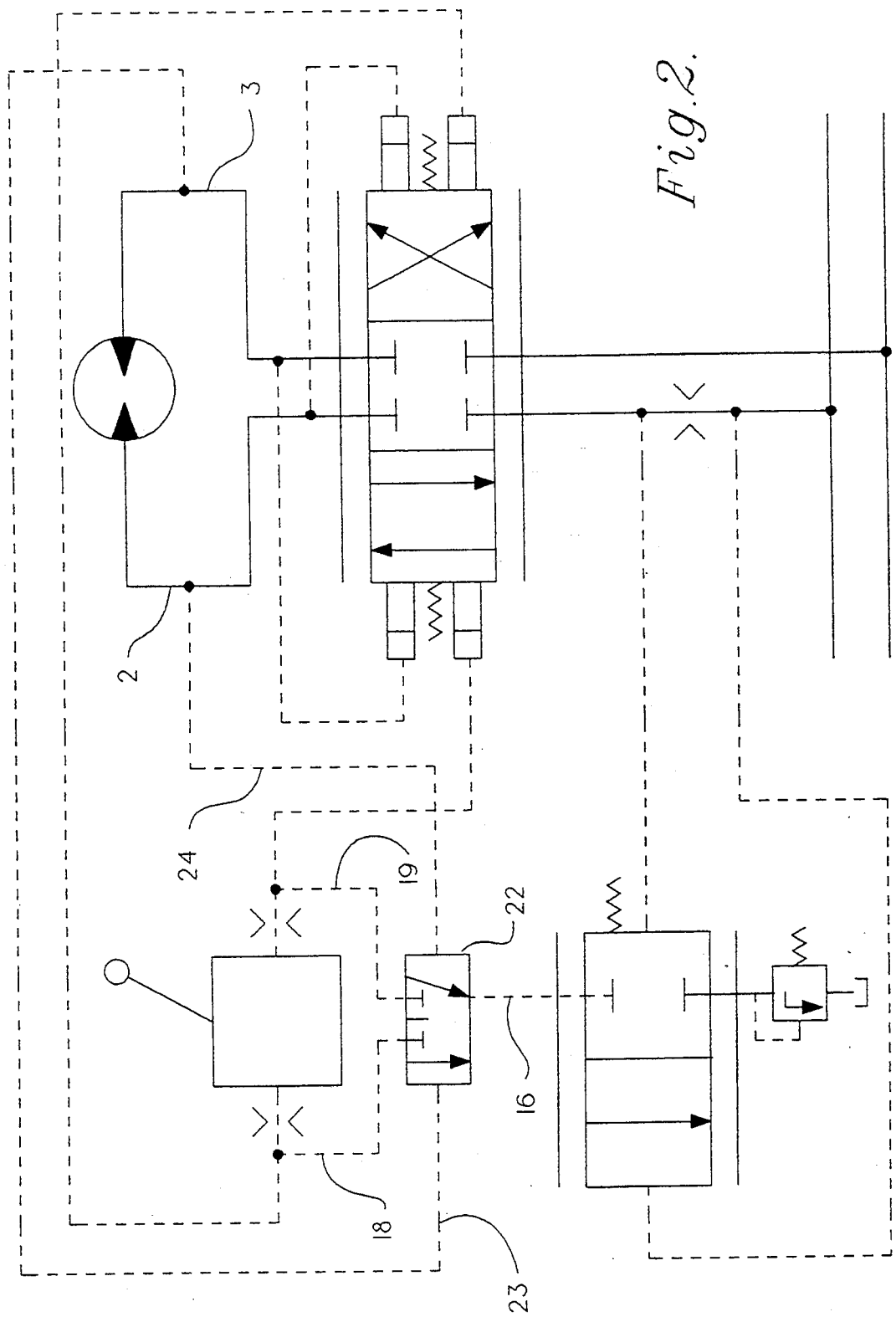
FIG. 2 shows a variant of the hydraulic drive system.

A variant of the implementation example is shown in FIG. 2, in which a 2-connection/2-position valve 22 that is actuated by pressure is provided instead of the change-over valve 17; it is connected on the input side to the lines 18 and 19 and connects them alternately with the drain line 16. For this purpose, a line 23 or 24 runs to each charging space of the valve 22 and it is connected with one of the lines 2 or 3. The control pressure that pertains to the highest load pressure is thus always fed into this drain line through this arrangement.

Figure 3:
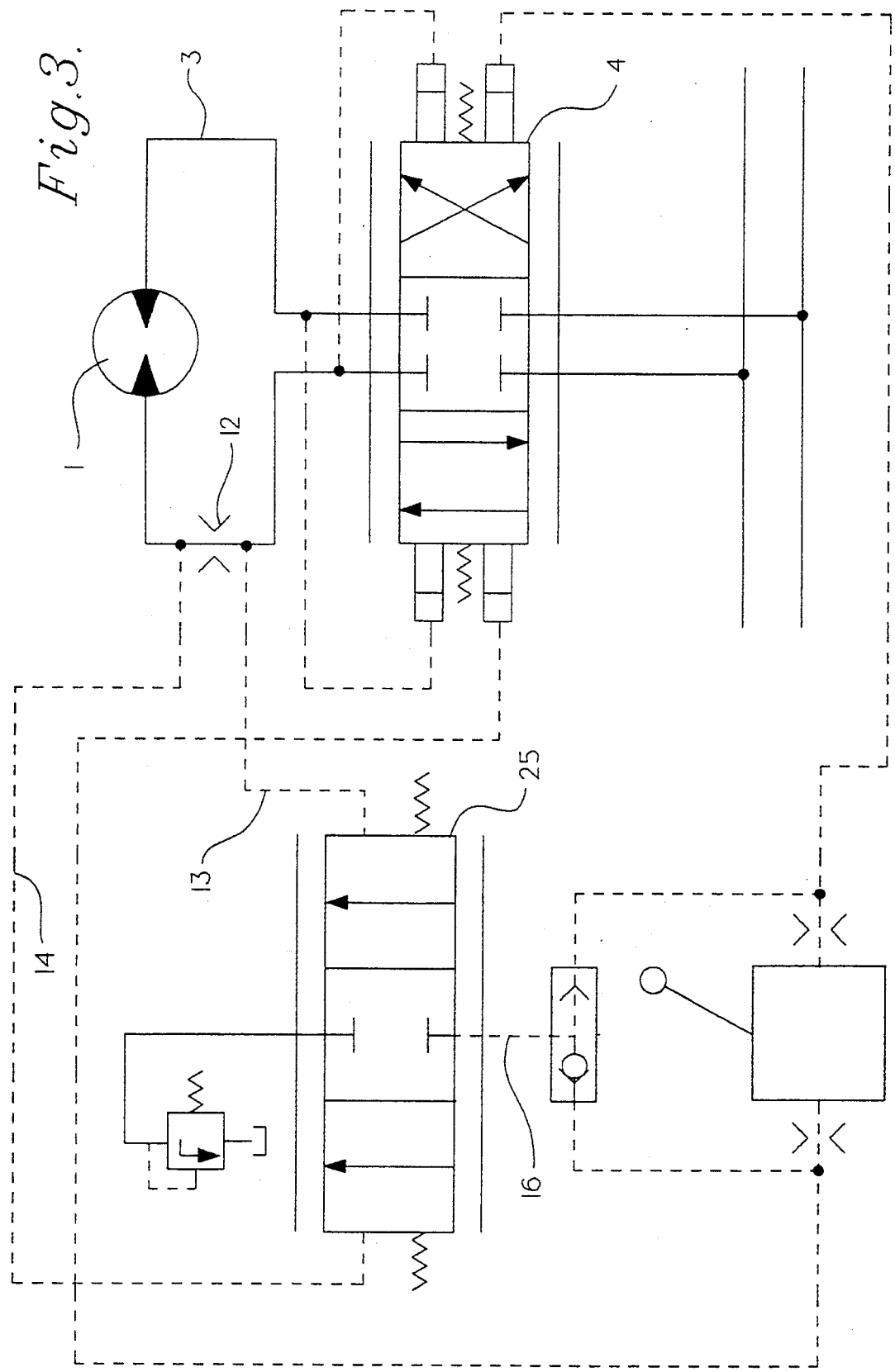
FIG. 3 shows another variant of the hydraulic drive system.

FIG. 3 shows a variant of the implementation example, in which the restrictor 12 is installed in line 2 and measures the volume stream there. Because the sign of the pressure gradient at the restrictor 12 changes when there is a reversal in rotation direction of the hydraulic motor 1, i.e., the pressure medium then flows from the control valve 4 through line 3 to the hydraulic motor 1 and from there through line 2, the throttling multiway valve in the drain line 16 is designed as a 2-connection/3-position valve 25 throttling in intermediate positions with two open positions and a closed position lying between them. The multiway valve thus opens, independently of which of lines 13 or 14 the higher load pressure is present in.

While certain presently preferred embodiments of the present invention have been described and illustrated, it is to be distinctly understood that the invention is not limited thereto but may be otherwise embodied and practiced within the scope of the following claims.

I claim:

1. Hydraulic drive system with a consumer of hydraulic power connected to a pressure medium source, said consumer operating at a load pressure comprising: a throttling control valve operatively connected to receive the load pressure of said consumer; and a control pressure pickoff operatively connected to provide a control signal to said throttling control valve, wherein said hydraulic drive system is actuated by means of said throttling control valve, said throttling control valve throttling in intermediate positions, and said throttling control valve having an opening width which is determined by a pressure difference created at the throttling control valve between the control signal from said control pressure pickoff and the load pressure of the consumer and wherein the control signal is influenced as a function of the movement speed of the consumer.

2. Hydraulic drive system according to claim 1, in which a control pressure line runs to a charging space of the throttling control valve that is active in the opening direction and a load pressure line that runs to an oppositely active charging space, wherein a drain line (16) branches off from the control pressure line (7, 8) and in which a spring loaded throttling multiway valve is installed and is in working connection with a measuring device that detects the movement speed of the consumer, said spring loaded throttling multiway valve throttling in intermediate positions and being spring-loaded in the closing direction.

3. Hydraulic drive system according to claim 2, wherein a pressure-limiting valve (20) is installed beyond the multiway valve.

4. Hydraulic drive system according to claim 3, wherein the pressure-limiting valve (20) is adjustable.

5. Hydraulic drive system according to claim 2, wherein the consumer is acted upon in both directions through two lines coming from the throttling control valve and wherein two control pressure lines emptying at oppositely active charging spaces lead to the throttling control valve designed as a 4-connection valve, said control pressure lines (7, 8) connected to inputs of a change-over valve (17), said change-over valve having an output connected to a drain line (16).

* * * * *